United States Patent
Rettig et al.

(10) Patent No.: US 9,683,883 B2
(45) Date of Patent: Jun. 20, 2017

(54) WEIGHING MODULE FOR MEASURING WHEEL CONTACT FORCES

(71) Applicant: Schenck Process GmbH, Darmstadt (DE)

(72) Inventors: Manfred Rettig, Muehltal (DE); Walter Matich, Eppertshausen (DE)

(73) Assignee: Schenck Process GmbH, Darmstadt (DE)

(*) Notice: Subject to any disclaimer, the term of this patent is extended or adjusted under 35 U.S.C. 154(b) by 593 days.

(21) Appl. No.: 13/856,839

(22) Filed: Apr. 4, 2013

(65) Prior Publication Data

US 2013/0220710 A1  Aug. 29, 2013

Related U.S. Application Data

(63) Continuation of application No. PCT/EP2011/004907, filed on Sep. 30, 2011.

(30) Foreign Application Priority Data

Oct. 4, 2010 (DE) .......... 10 2010 047 234

(51) Int. Cl.
*G01G 19/02* (2006.01)
*G01G 19/04* (2006.01)

(52) U.S. Cl.
CPC ......... *G01G 19/025* (2013.01); *G01G 19/047* (2013.01)

(58) Field of Classification Search
CPC ..................... G01G 19/02–19/047
See application file for complete search history.

(56) References Cited

U.S. PATENT DOCUMENTS

| | | | | |
|---|---|---|---|---|
| 2,873,918 A | * | 2/1959 | Rosebrook | E01B 11/42 238/174 |
| 3,356,170 A | * | 12/1967 | Cory | G01G 3/1406 177/163 |
| 3,734,216 A | * | 5/1973 | Nordstrom | G01G 3/1404 177/136 |

(Continued)

FOREIGN PATENT DOCUMENTS

| | | |
|---|---|---|
| CN | 2316642 Y | 4/1999 |
| DE | 21 47 096 | 4/1972 |

(Continued)

OTHER PUBLICATIONS

First Chinese Office Action for Chinese Application No. 201180048364.1 dated Mar. 5, 2014—English translation.

*Primary Examiner* — Natalie Huls
(74) *Attorney, Agent, or Firm* — Muncy, Geissler, Olds & Lowe, P.C.

(57) ABSTRACT

The present invention relates to a weighing module for measuring wheel contact forces of rail-bound vehicles, comprising a measuring rail and a number of strain gauges, wherein the strain gauges are applied directly on the measuring rail. The measuring rail comprises a load introduction region, made of at least one load introduction part, and at least two deformation bodies, which are connected fixedly in each case to a load output plate and, via a hinge, to the load introduction region. The strain gauges are arranged on the deformation bodies and capture the shear strain acting between the hinges and load output plates.

8 Claims, 11 Drawing Sheets

(56) References Cited

U.S. PATENT DOCUMENTS

| | | | | | |
|---|---|---|---|---|---|
| 3,741,327 | A | * | 6/1973 | Nordstrom | G01G 19/04 177/163 |
| 3,746,111 | A | * | 7/1973 | Berthiaume | G01G 19/04 177/163 |
| 3,747,715 | A | * | 7/1973 | Nordstrom | G01G 19/04 177/134 |
| 3,770,068 | A | * | 11/1973 | Ahl | G01G 19/02 177/134 |
| 4,134,464 | A | * | 1/1979 | Johnson | G01G 19/047 177/163 |
| 4,657,096 | A | * | 4/1987 | Angelbeck | G01G 19/047 177/134 |
| 4,701,866 | A | * | 10/1987 | Harrison | G01G 19/047 177/163 |
| 4,775,018 | A | * | 10/1988 | Kroll | G01G 19/027 177/134 |
| 5,224,561 | A | * | 7/1993 | Ahl | G01G 19/047 177/163 |
| 5,265,481 | A | * | 11/1993 | Sonderegger | G01G 3/13 177/210 C |
| 6,822,172 | B2 | * | 11/2004 | Rice | G01G 19/021 177/132 |
| 2010/0243338 | A1 | * | 9/2010 | Budic | G01G 21/24 177/136 |

FOREIGN PATENT DOCUMENTS

| | | |
|---|---|---|
| DE | 27 58 997 | 7/1979 |
| DE | 103 04 008 A1 | 8/2004 |
| DE | 10 2004 017 613 A1 | 11/2005 |
| GB | 2 057 149 A | 3/1981 |

* cited by examiner

WEIGHING MODULE FOR MEASURING WHEEL CONTACT FORCES

This nonprovisional application is a continuation of International Application No. PCT/EP2011/004907, which was filed on Sep. 30, 2011, and which claims priority to German Patent Application No. DE 10 2010 047 234.4, which was filed in Germany on Oct. 4, 2010, and which are both herein incorporated by reference.

BACKGROUND OF THE INVENTION

Field of the Invention

The present invention relates to a weighing module for measuring wheel contact forces of rail-borne vehicles.

Description of the Background Art

To measure wheel contact forces on rail vehicles, a suitable force measuring device is required for each wheel, which is to say a weighing apparatus is required that is built into a special measuring track. Inserted in appropriate positions in the rails of a measuring track are measuring bridges to which weighing sensors are attached. These weighing sensors generally are supported on special foundation plates that are intended to ensure a rigid connection to the track substructure into which the absorbed forces are conducted.

Because of the installation space required or the installation height of such an external measuring device, it is often necessary to make structural adaptations to the foundation. In particular for existing track installations that are to be retrofitted with such a weighing technology, suitable modifications are not feasible.

As a result of the attachment of the weighing sensors to a measuring bridge, which generally is accomplished by means of screw fittings, the measurement system has its own disturbing influence, which causes measurement errors in the force being ascertained. Consequently, calibration is always necessary in conventional measuring devices for wheel contact forces in order to be able to ascertain the precise properties of the measuring device.

SUMMARY OF THE INVENTION

It is therefore an object of the invention to provide a measuring device, having a measuring bridge and weighing sensors, for measuring wheel contact forces that does not require any adaptations to the track substructure, but instead can be attached directly to an existing rail mount, e.g. to ribbed plates.

According to an embodiment of the invention, a weighing module for measuring wheel contact forces of rail-borne vehicles is proposed that comprises a measuring rail and a number of strain gauges that are applied directly to the measuring rail. The measuring rail, in turn, has a load introduction region that is composed of at least one load introduction part and at least two deformation bodies. The deformation bodies are rigidly connected (which is to say statically) to one load exit plate each, and are connected to the load introduction region by one link each. The strain gauges are arranged on the deformation bodies and sense the shear strains acting between the links and the load exit plates.

The measuring rail according to an embodiment of the invention, with the strain gauges applied directly to the rail body, constitutes a compact, one-piece, and hence stand-alone, weighing module. An especially advantageous feature of such a one-piece construction is that it is possible to forego the calibration that is required in prior art measuring bridges with externally screw-mounted weighing sensors. The precision with which the manufacture is determined thus corresponds to the precision of the weighing module in the installed state.

The one-piece measuring rail according to an embodiment of the invention can be made from a rail profile that includes at least a rail head and a rail web. In ideal fashion, the profile of the measuring rail can correspond to the profile of the railway tracks within which one measuring rail or multiple measuring rails is/are to be installed in order to provide a measuring section. Consequently, a measuring rail can also be made from a full rail profile. Thus, in order to provide a measuring section it is only necessary to install the measuring rail in place of the rail of an existing track, which is to say a railway track, or replace the railway tracks with a number of measuring rails. As a general rule, therefore, other common or application-specific rail profile types also come into consideration for a given measuring rail.

An active shear strain region of the deformation body can be formed between the links and the load exit plates. Pockets for accommodating the strain gauges can be provided in the shear strain regions.

In addition, the deformation bodies can have a bevel on a lateral side of the measuring rail for connecting a neighboring rail, which bevel is suitable for routing an electrical contact for the strain gauges.

According to an embodiment, the measuring rail of a weighing module according to the invention can have two deformation bodies. Each of the links thus is preferably arranged at one of the two ends of the measuring rail. As a result, the load introduction part then extends over the entire length of the measuring rail and forms the active measuring section of the weighing module.

As a result of this special design, it is possible for the change in length of the load introduction part arising in the case of bending due to a high weight loading to have only a minor influence on the deformation bodies and thus only a minor influence on the measurement result.

The measuring rail can be constructed with mirror-image symmetry in its longitudinal direction, so that the load introduction part is supported symmetrically by the two links on the two deformation bodies.

The geometry of the measuring rail thus makes it possible for the wheel contact force to always be introduced through the two links into the two deformation bodies, regardless of the position that a wheel being tested assumes on the measuring rail. Another advantage is in that the tensile forces that arise during driving can be transmitted to the deformation bodies and sensed by the strain gauges'.

If a number of strain gauges with which a complete Wheatstone measuring bridge can be implemented are arranged on each deformation body, then in the case of weighing modules with symmetrically arranged deformation bodies, wheel positions on a given weighing module can additionally be determined, and consequently axle bases, as well.

An alternative form of the weighing module according to an embodiment of the invention can comprise a measuring rail with at least three load introduction parts and the same number of deformation bodies. The measuring rail additionally comprises a seat and a connector, wherein the connector is designed to be brought into engagement with a seat of a measuring rail of another weighing module.

In consequence, a relatively long measuring section can be assembled very simply from a number of such weighing modules that preferably also have been produced as a single piece.

In each case, one outer load introduction part of the measuring rails is supported only on a deformation body of the same measuring rail. During construction of a measuring section, this load introduction part is then preferably supported on the deformation body of another, i.e., neighboring, weighing module. This support is achieved through the paired seats and connectors of the measuring rails of neighboring weighing modules that are introduced into the rail body.

Thus, once again the wheel contact force can be introduced through the two links into two deformation bodies, generally by one load introduction part in each case, regardless of the position that a wheel being tested assumes on the measuring rail, and in addition the tensile forces that arise during driving are transmitted to the deformation bodies and consequently can be sensed by the strain gauges.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 6:
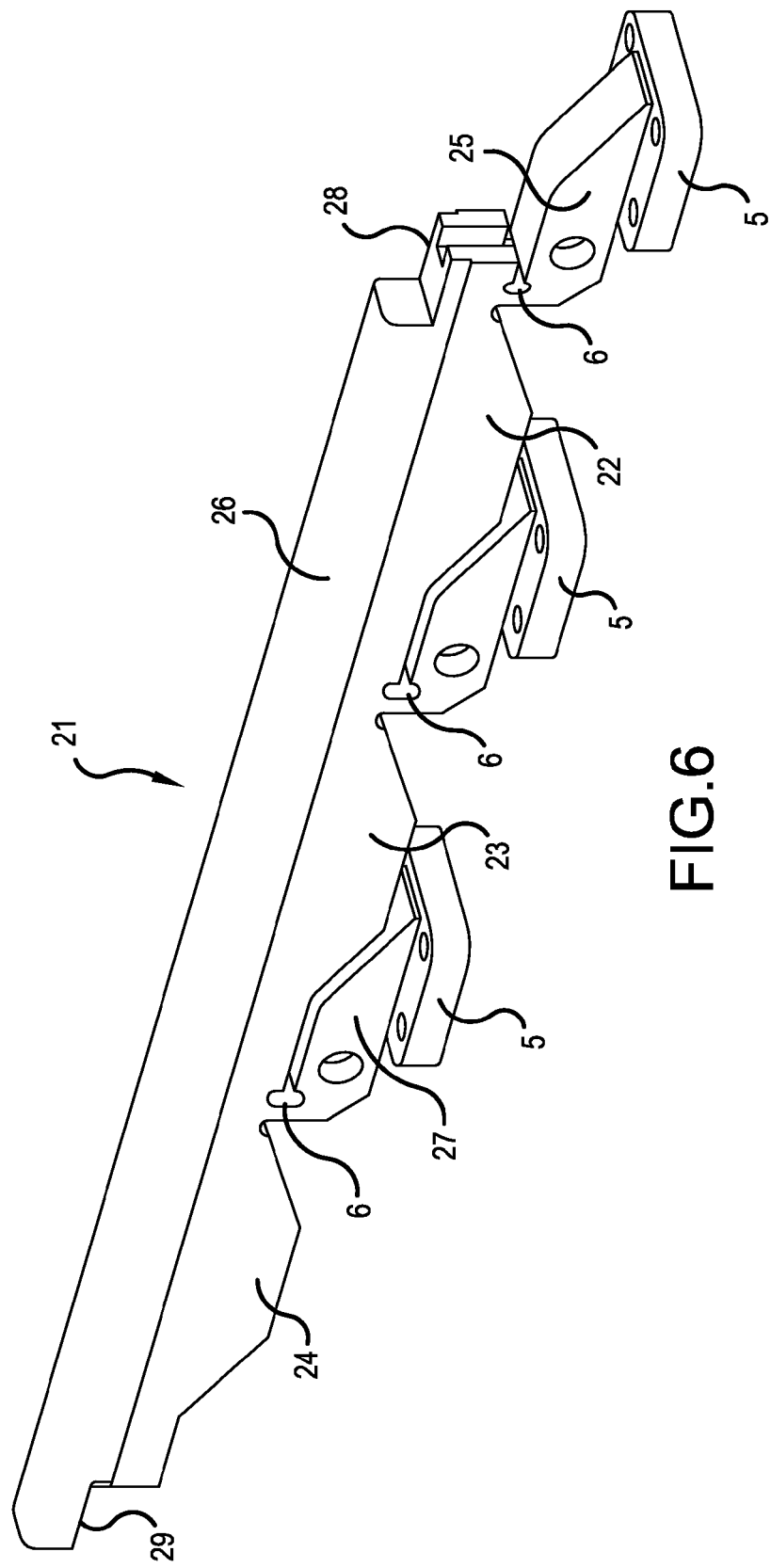
FIG. 6 is a perspective view of a weighing module with a measuring rail made from a rail profile with three deformation bodies.
Figure 7:
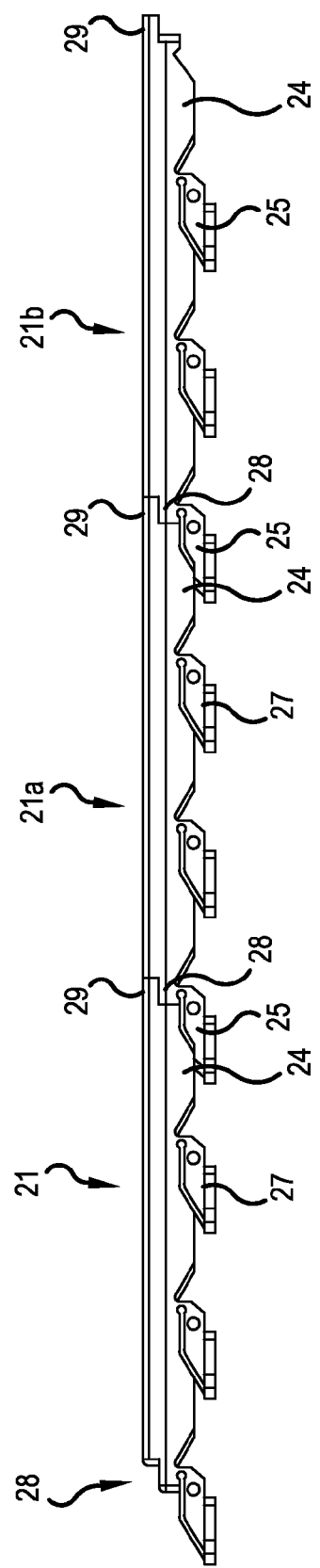
FIG. 7 is a measuring track with three connected weighing modules as in FIG. 6.
Figure 8:
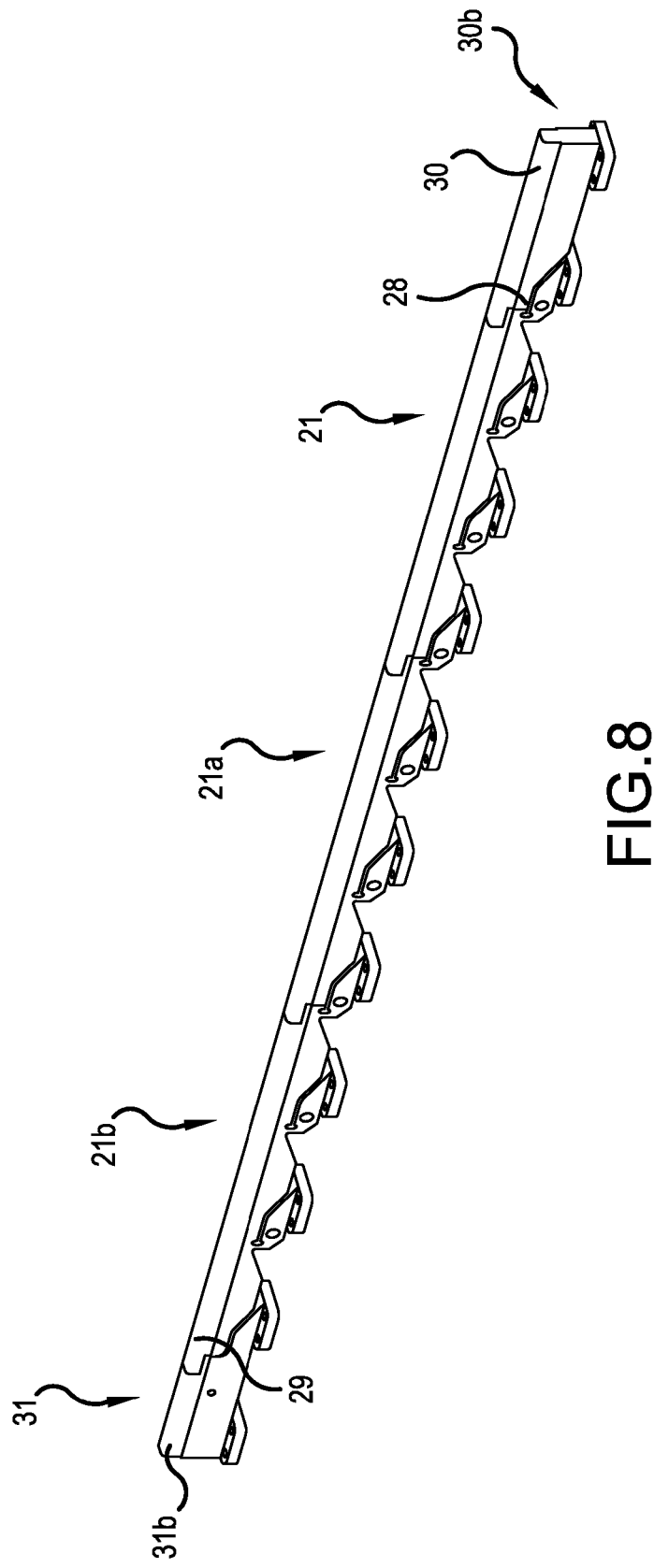
FIG. 8 is a measuring track with three connected weighing modules as in FIG. 7 and end pieces located on both sides.

Before the figures are discussed in detail, it should be noted that FIGS. 1, 2, 4, 5 and 11 show a first group of weighing modules according to an exemplary embodiment of the invention, each of which has two symmetrically arranged measuring points. These embodiments can be built directly into a separate track, for example, and can measure the wheel contact force of a wheel. FIGS. 6, 7, and 8 show a second group of exemplary embodiments of weighing modules according to the invention that have at least three measuring points. It is especially simple to arrange any number of such weighing modules in a row.

In addition, corresponding reference numbers appearing in the figures refer to components that are identical or function identically.

Figure 1:
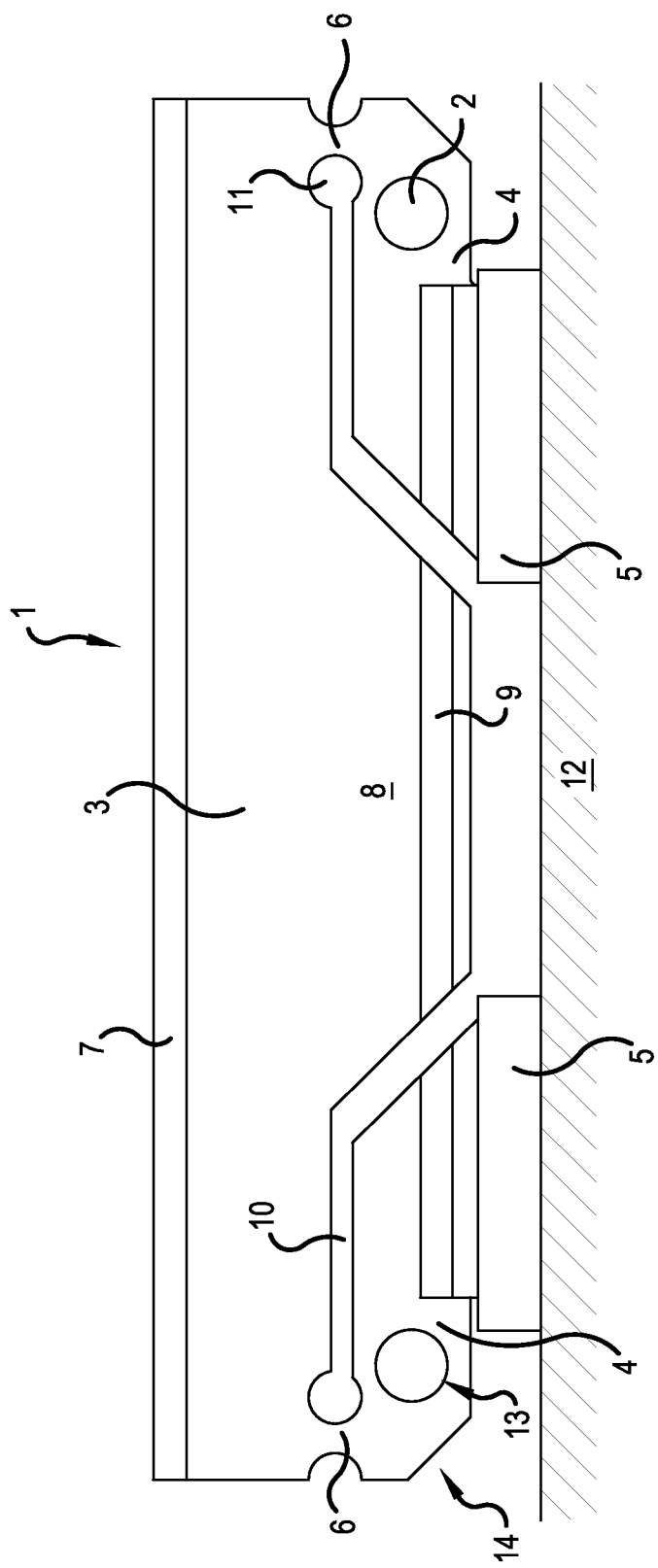
FIG. 1 is a side or longitudinal view of a weighing module with a measuring rail made from a full rail profile.

Shown in FIG. 1 is a first exemplary embodiment of a weighing module according to the invention for measuring wheel contact forces of rail-borne vehicles. This weighing module comprises essentially the body of a measuring rail 1, to which are applied a number of strain gauges 2. The base body of the measuring rail shown can be composed of a construction rail profile of type Vo 1-54, for example, although other common or application-specific rail profiles also come into consideration as the base body for a particular measuring rail as a general rule.

The measuring section, within which the wheel contact forces of a rail-borne vehicle can be sensed, includes essentially the entire length of the measuring rail 1 shown. The head 7 and the web 8 of the measuring rail have approximately the same width in profile, so that the rail head 7 and the rail web 8 transition smoothly into one another along the rail height. A rail foot 9 is provided at the bottom of the profile. As already mentioned at the outset, other rail profiles also come into consideration.

The measuring rail 1 is structured in the region of the rail web 8 and rail foot 9 by means of two slots 10 that pierce the body of the rail profile in its width. Starting from a bore 11 that is located at a defined distance from one of the opposite rail ends, each of the two slots extends in the longitudinal direction of the measuring rail, first horizontally toward the center of the rail and, after a defined distance, inclined at an angle toward the rail foot 9. Moreover, a link 6 is defined in each case by this defined distance.

A suitable structuring can be accomplished by means of metal-cutting production, for example.

A measuring rail 1 structured in such a manner thus forms a load introduction region with a load introduction part 3, two deformation bodies 4, and two links 6. Accordingly, the links 6 are located at each end of the measuring rail 1, so that one of the links 6 connects the load introduction part 3 to one of the two deformation bodies 4 in each case. Provided under each of the deformation bodies 4 is a load exit plate 5 with which the measuring rail 1 can be rigidly attached to a substructure 12, e.g., a concrete foundation.

The load exit plates 5 preferably are rigidly connected to the relevant deformation body 4, wherein this connection can take place, for example, by means of thermal joining or through a screw connection that is not shown. As a general rule, a unit having a measuring rail 1 and load exit plate 5 can also be produced from a one-piece base body. Likewise, the load exit plates 5 can also be part of a rail mount, e.g., a ribbed plate, so that the rigid connection for rail mounting can be accomplished by means of external clamps.

The load introduction part 3 extends in the longitudinal direction over the entire length of the measuring rail 1 and has the full height of the rail profile in the region located between the two deformation bodies 4, and is supported via the two links 6 on the two deformation bodies 4 and on the load exit plates 5 located thereunder.

Regardless of the position on the rail head 7 at which the contact force of a wheel is introduced into the load introduction part 3, the force is always transmitted into the deformation bodies 4 through the links 6. As a result of the arrangement of the links 6 according to the invention, an exact force transmission is achieved, wherein, in particular, the influence on the two deformation bodies 4, and hence on the measurement result as well, of changes in length of the load introduction part 3 that can arise in the case of bending due to a high weight loading is reduced. Furthermore, the arrangement of the links 6 according to the invention permits the transmission and measurement of tensile forces that arise during driving on the measuring rail 1.

The two deformation bodies 4 are designed such that the shear stresses caused by forces transmitted through the two links into the two deformation bodies 4 can be sensed between the links 6 and the load exit plates 5 located under the rail foot 9 by means of strain gauges 2.

A number of strain gauges are located on each deformation body, with which a complete Wheatstone measuring bridge, and thus a measuring point, can be implemented at each deformation body.

Two strain gauges 2 with two resistance regions each are arranged in each deformation body 4, as described below. A measuring point is defined in each case by such an arrangement of two strain gauges 2 in each deformation body 4.

As is evident from FIG. 1, the two links 6 are each arranged at one end of the measuring rail 1 for the purpose of load or force transmission. The load exit plates 5 are offset in the longitudinal direction toward the rail ends, so that an active deformation region is produced in the two deformation bodies 4 in the longitudinal direction between the relevant link 6 and the side of a load exit plate 5 facing the relevant rail end. In order to guarantee an optimal deformation, the rail foot of the rail profile that is shown by way of example has been removed in the regions between the rail ends and deformation bodies 4.

Figure 11:
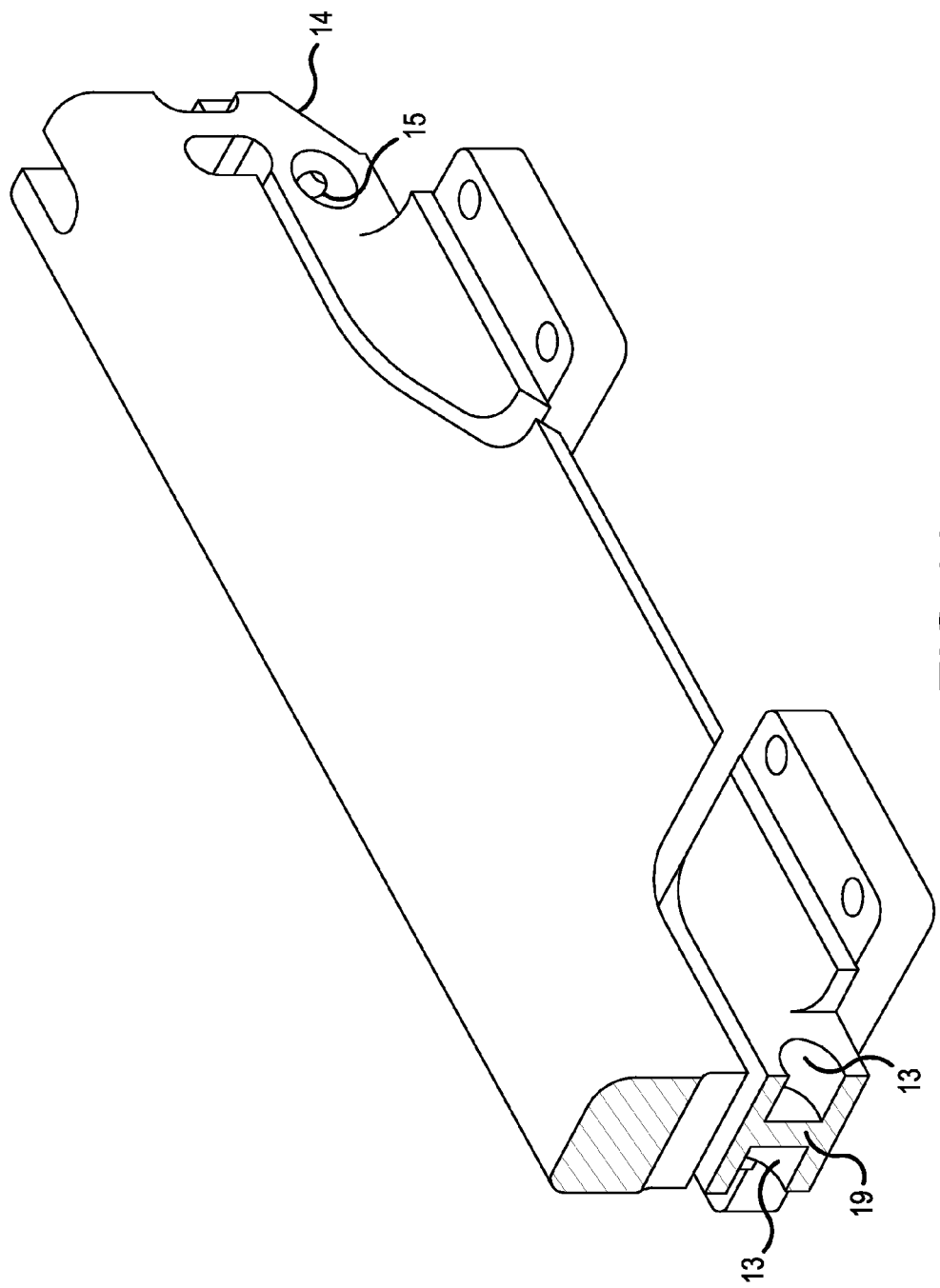
FIG. 11 is a cutaway view of the weighing module from FIG. 2.

As is also readily evident in FIG. 1 and in particular in FIG. 11, which shows a cutaway view of another embodiment, the strain gauges 2 that are used for measurement of the shear strains in the deformation bodies 4 preferably are each located in a pocket 13, which can be introduced laterally into the relevant deformation body 4, for example in the form of a blind hole. The pockets 13 serve to accommodate the strain gauges 2, and are each located in the shear strain region of a deformation body 4.

Each deformation body can have two pockets 13 separated from one another by a web 19, as can be seen in FIG. 11 in particular, wherein either two strain gauges, or preferably one strain gauge with two resistance regions, i.e. a double strain gauge, are in turn located in each pocket. Moreover, regardless of whether two strain gauges with one resistance region each or one strain gauge with two resistance regions are placed in each pocket, the resistance regions of the strain gauges, which are not shown in detail in the figures, usefully are also oriented at a 45° angle to one another within a given pocket 13 of a deformation body 4, e.g., as two serpentine regions oriented at a 45° angle to one another, so that shear stresses and/or displacement angles can also be calculated from the measured elongations. Such an orientation can in general be considerably simplified by the use of suitably prefabricated double strain gauges.

The bottom edges of the longitudinal sides of the measuring rail shown in FIG. 1, as well as the measuring rails shown in FIGS. 2, 4, 5 and 11, are each provided with a bevel, for example a 45° bevel 14. As is evident in particular from FIGS. 2 and 11, this bevel 14 is suitable for routing electrical connections for contacting the strain gauges located in the pockets 13. In the installed state, both sides of the measuring rail are abutted by, e.g., additional measuring rails next to it or, in an alternative, the rails of a relevant track, also called railway tracks, wherein at most a small gap between the measuring rail and railway track is permissible. By means of the bore 15 shown in FIGS. 2 and 11, the electrical connections of the strain gauges can be routed out of the relevant pockets 13. As a result of the bevel 14, there is sufficient spacing to an additional, abutting measuring rail—not shown in FIGS. 1, 2, 5 and 11—or alternative adjacent rail of a track, to lead out a suitable cable. Such a sufficient spacing is readily apparent in the row arrangement of a preferred refinement shown in FIG. 4, for example.

Figure 2:
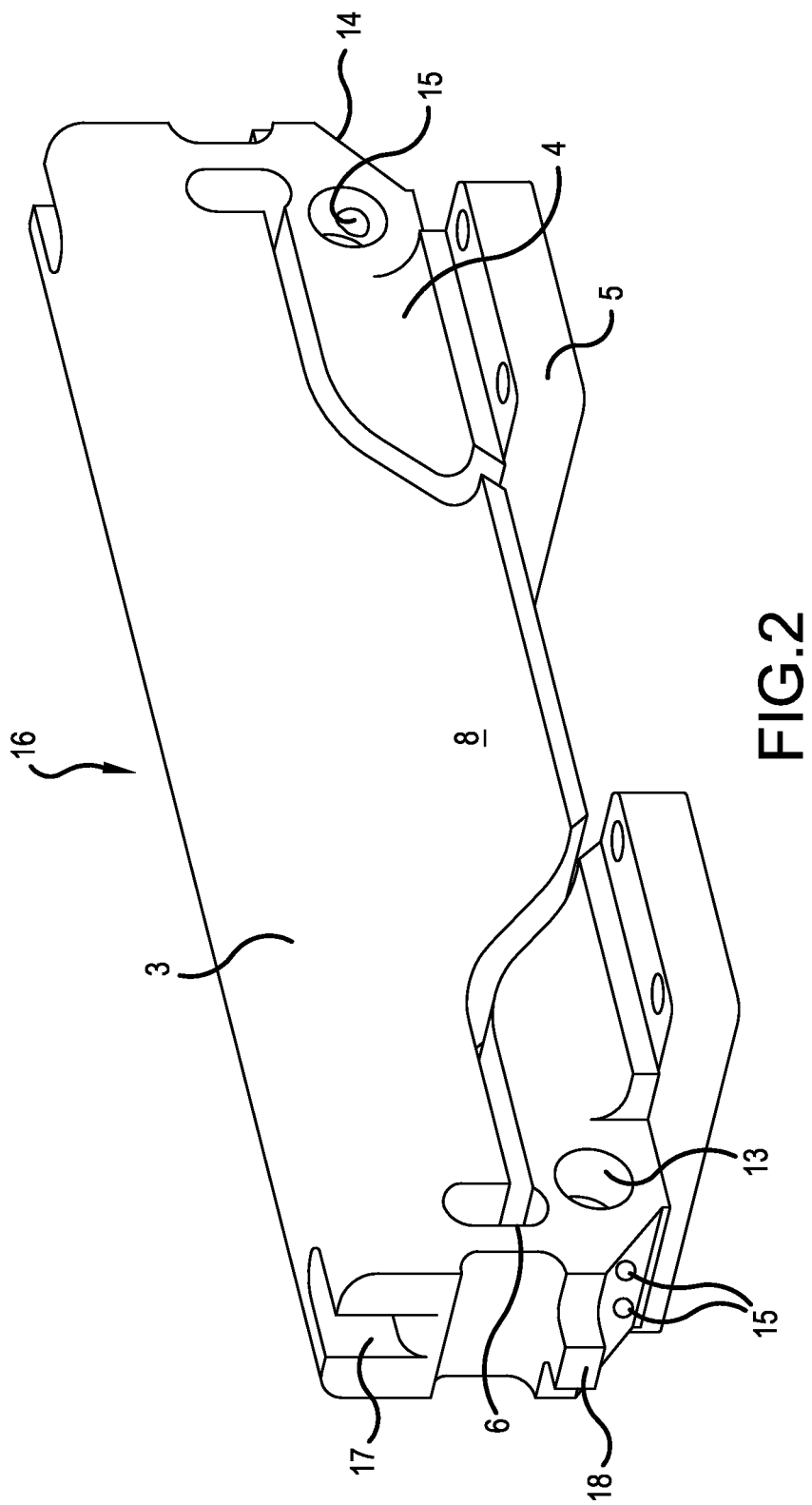
FIG. 2 is a perspective view of a weighing module made from a full rail profile with tongue and groove for connection to spacers.

FIGS. 2 and 11 show such an embodiment of a weighing module according to the invention, wherein FIG. 11 is a cutaway view of the weighing module from FIG. 2. A measuring rail 16 shown there differs from the measuring rail 1 from FIG. 1. Nonetheless, the measuring rail 16, like the embodiment described above with reference to FIG. 1, includes a construction rail profile from whose rail body, in particular in the region of the web 8, are formed two links 6, two deformation bodies 4 that each have two pockets 13 for accommodating a number of strain gauges—not shown in detail—to provide one measuring point for each deformation body, and a load introduction part 3.

In contrast to the weighing module shown in FIG. 1, the measuring rail 16 of the weighing module shown in FIGS. 2 and 11 has a connector at each of its two ends, each of which has a groove 17 and a tongue 18. Using the connector shown and a suitably matched spacer 19, one embodiment of which is shown in FIG. 3 by way of example, multiple measuring rails 16 can be brought into engagement with one another in an extremely simple manner such that a measuring track can be constructed with any desired length, as shown in FIG. 4, for example.

Figure 3:
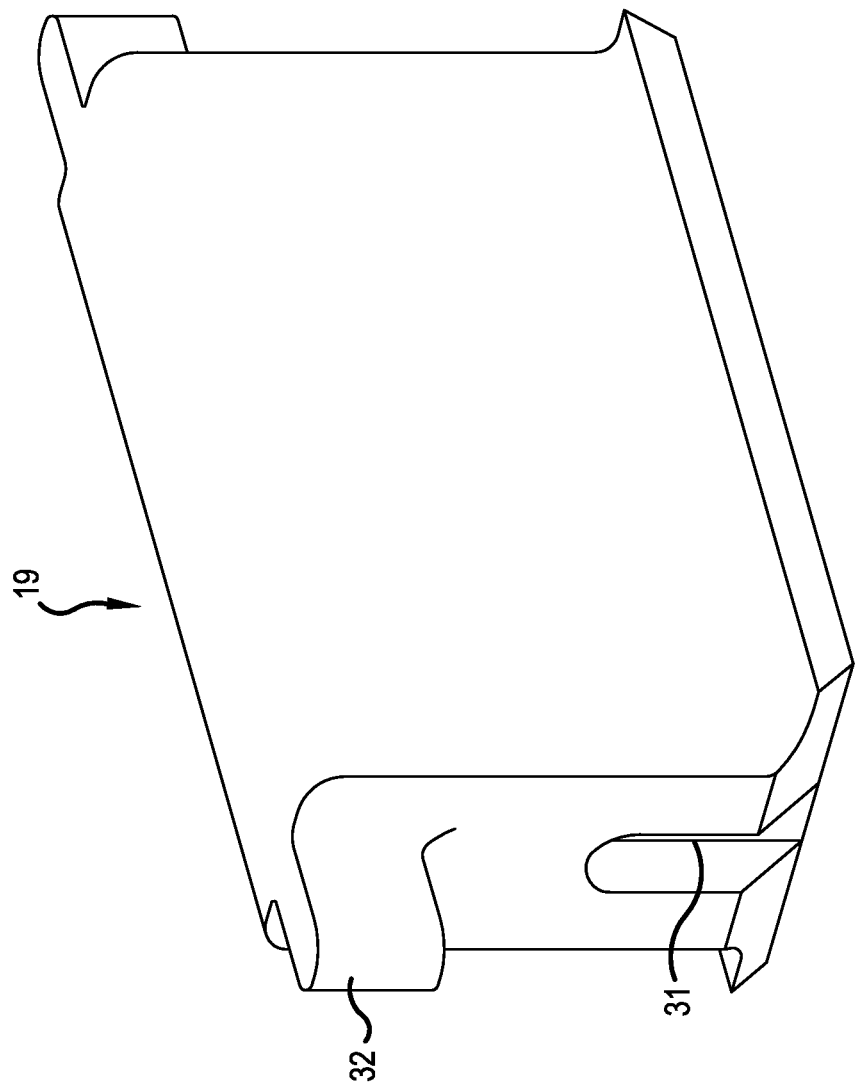
FIG. 3 is a perspective view of a spacer for a measuring rail as shown in FIG. 2.

FIG. 3 shows one embodiment of an appropriate spacer 19, which like the measuring rail 16 preferably is made from a construction profile or full rail profile, wherein a connector of complementary design to the measuring rail 16 having a tongue 32 and groove 31 is provided at its ends. The measuring rail 16 and the spacer 19 thus provide a connecting system with which it is especially easy to assemble a measuring track of any desired length for later installation in an existing track system.

The rails of an existing track, which is to say the railway tracks, need only be removed over the length of a desired measuring track and replaced with a number of measuring rails 16 and spacers 19.

Figure 4:
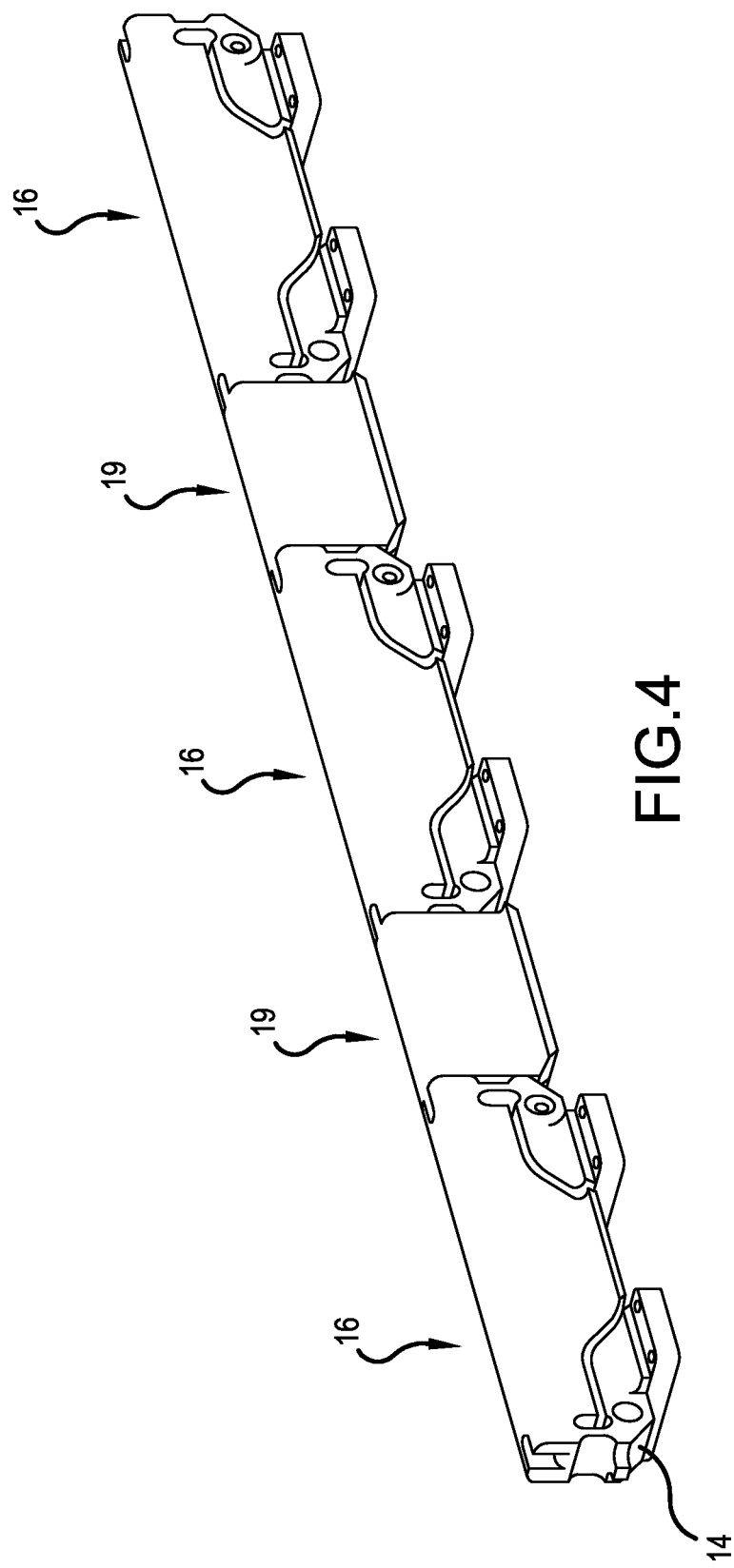
FIG. 4 is a measuring track with three weighing modules connected to one another by spacers.

As already mentioned, FIG. 4 shows by way of example a measuring track comprising three measuring rails 16, wherein each pair of measuring rails 16 is connected by a spacer 19. The measuring track can be terminated at each of the first and last measuring rails with an end piece, not shown in the Figures, that ensures an essentially joint-free transition to the railway tracks adjacent thereto.

Figure 5:
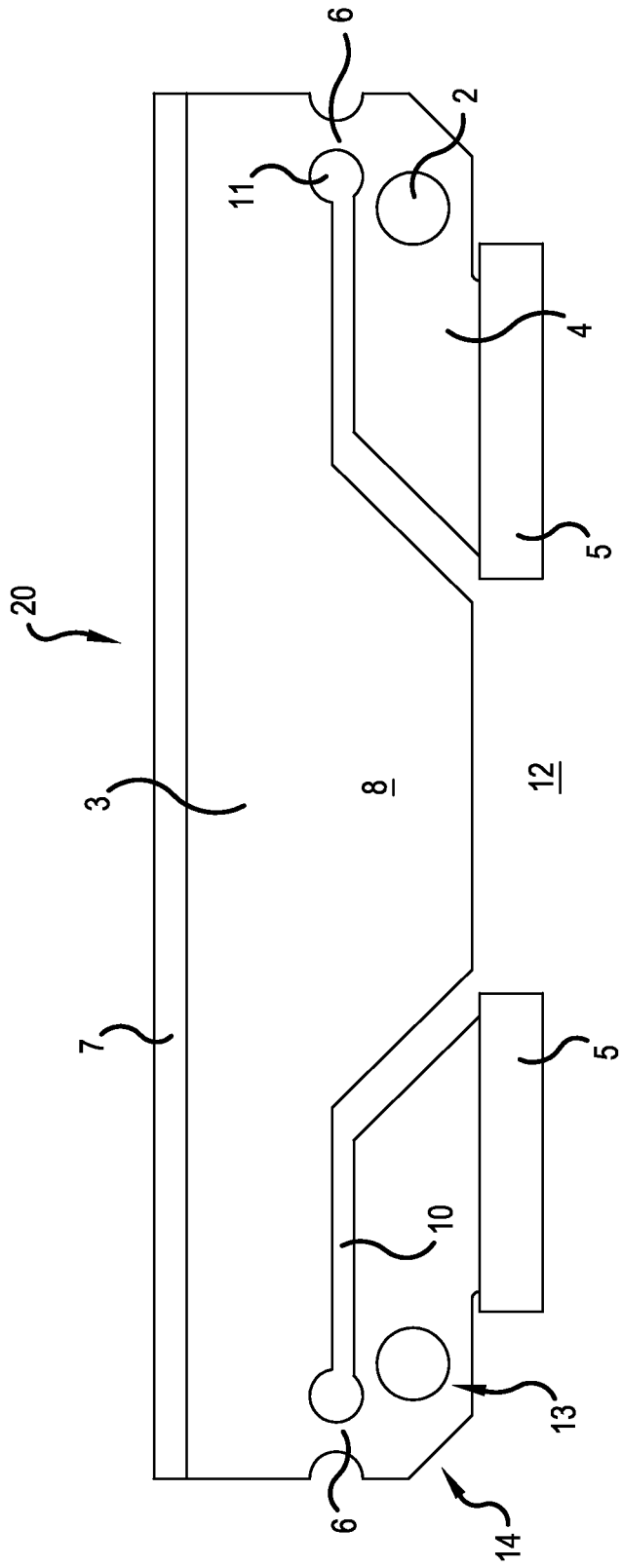
FIG. 5 is a side or longitudinal view of a weighing module with a measuring rail made from a rail profile with no rail foot.

FIG. 5 shows an alternative embodiment of a weighing module according to the invention in which, in contrast to the embodiments described above, a rail profile with no rail foot is used instead of a full rail profile as the base body for the measuring rail 20 employed there. Such an embodiment can be used when the material properties of a full rail cannot be employed for measurement reasons, for example.

All in all, therefore, FIGS. 1, 2, 4, 5 and 11 show weighing modules according to an exemplary embodiment of the invention, each of which has two symmetrically arranged measuring points, wherein these embodiments can be placed, e.g., directly in a separated track to ascertain the wheel contact force of a wheel. As a result of specially designed connectors that are secured between at least two weighing modules, measuring sections of any desired length can be constructed, for example measuring sections as in FIG. 4 using connectors as in FIG. 3 for weighing modules as in FIG. 2. However, in the case of relatively low maximum wheel loads, including in the case of streetcars for example, the connectors themselves can also be elongated in such a manner that one can construct a measuring section of equal length with fewer measuring points.

Furthermore, using weighing modules with symmetrically arranged measuring points, it is possible to ascertain positions of a wheel on a relevant weighing module, and thus to ascertain axle bases as well.

FIG. 6 shows another embodiment of the invention. For example, the measuring rail 21 shown there can be produced from a profile without a rail foot as shown, and comprises a load introduction region made up of at least three load introduction parts 22, 23, 24, wherein the at least three load introduction parts 22, 23, 24 as a whole are connected by an equal number of links 6 to an equal number of deformation bodies 25, 26, 27. In this design, all deformation bodies extend in the same direction and are consequently aligned with one another so that in each case an outside load introduction part 24 is supported only on one deformation body 27. In the example shown, the measuring rail 21 has three load introduction parts 22, 23, 24, three links 6, and three deformation bodies 25, 26, 27, each of which again has two pockets for accommodating strain gauges. Such a measuring rail thus defines three measuring points. The measuring rail 21 can be made from the base body of a rail profile or any other semifinished product, for example by metal-cutting methods, wherein the load exit plates 5 can likewise constitute a one-piece unit with the deformation bodies 25, 26, 27.

The ends of the measuring rail 21 have a seat surface 28 and connecting surface 29, which are shaped such that a number of individual measuring rails can be arranged in a row and brought into engagement with one another so that measuring tracks with a specific required or desired length can be assembled. A corresponding measuring track with three measuring rails 21, 21a and 21b is shown by way of example in FIG. 7. In a manner similar to the preceding embodiments, suitably matched end pieces that ensure an essentially joint-free transition to the railway tracks adjacent thereto can be provided for terminating the measuring track. A suitably terminated measuring track with three measuring rails 21, 21a and 21b as in FIG. 7 is shown in FIG. 8 by way of example.

Each load introduction region of each measuring rail 21, 21a or 21b forms three load introduction parts 22, 23, 24, wherein in each case only two load introduction parts 22 and 23 of each measuring rail are supported on two adjoining deformation bodies of the same measuring rail.

As is evident from FIGS. 7 and 8, one outer load introduction part 24 of each measuring rail 21, 21a, and 21b, which in FIG. 7 is always the right-hand load introduction part, is supported on the one hand on the deformation body 27 of the same measuring rail 21, 21a or 21b, while the opposite side of the load introduction part 24 of the measuring rail 21 is supported via the connecting surface 29 of the measuring rail 21 on the seat surface 28 and deformation body 25 of the measuring rail 21a. In a corresponding manner, the opposite side of the load introduction part 24 of the measuring rail 21a is supported via the connecting surface 29 of the measuring rail 21a on the seat surface 28 and deformation body 25 of the measuring rail 21b.

Figure 9:
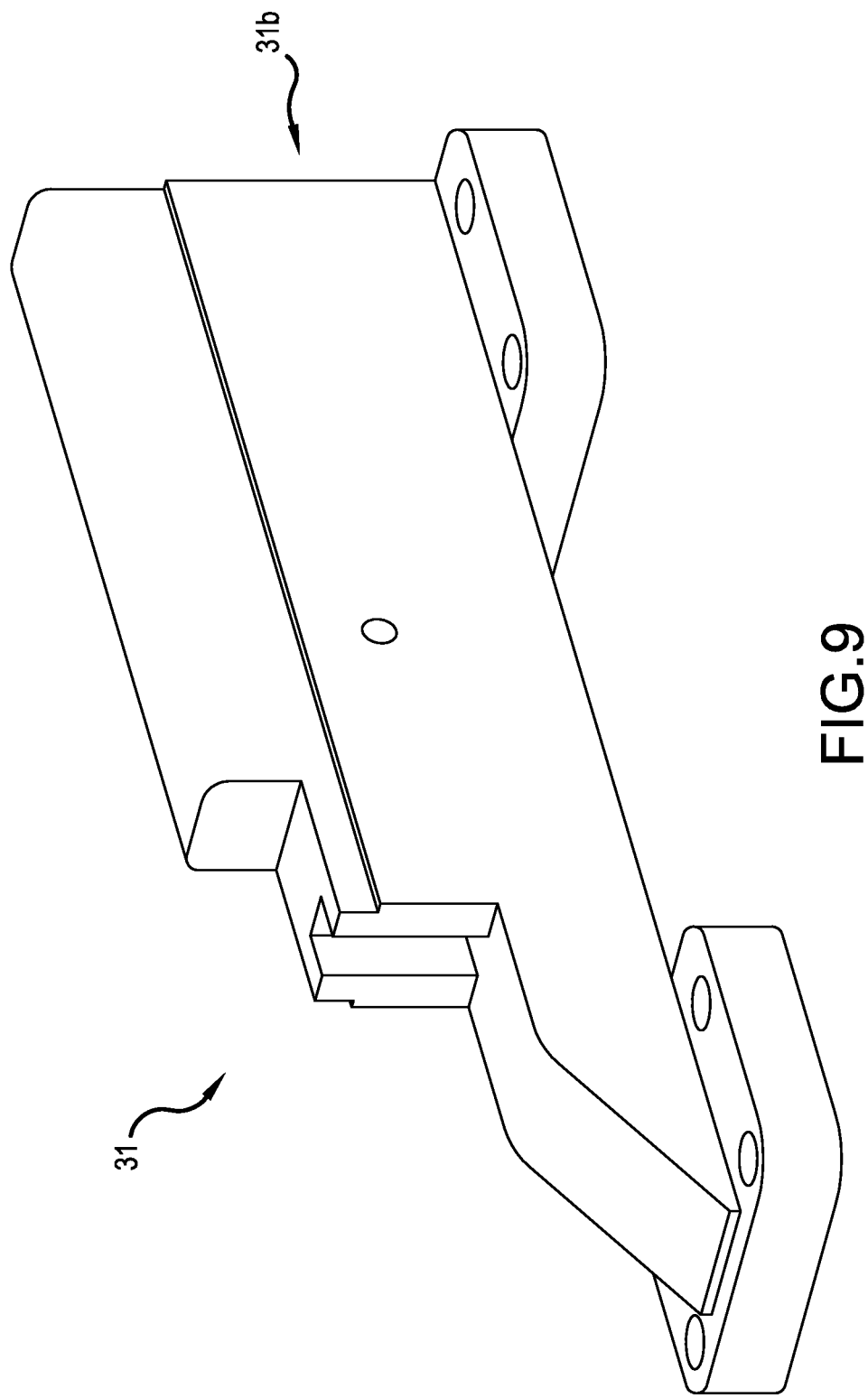
FIG. 9 is an embodiment of an end piece for a measuring track from FIG. 8.

Accordingly, support for the load introduction part 24 of the measuring rail 21b is provided by the connecting surface 29 of the same measuring rail 21b, wherein preferably a suitably adapted end piece or terminating piece 31, such as can be seen in FIG. 8, can be provided. The end piece or terminating piece 31 used in FIG. 8 is shown enlarged in FIG. 9. Such a piece is further adapted to substantially simultaneously allow a transition to a railway track, not shown in FIGS. 7 and 8, adjoining the end of the measuring track. In the simplest case, this can be accomplished by means of a flat terminating surface 31b, as can be seen in FIG. 9.

Figure 10:
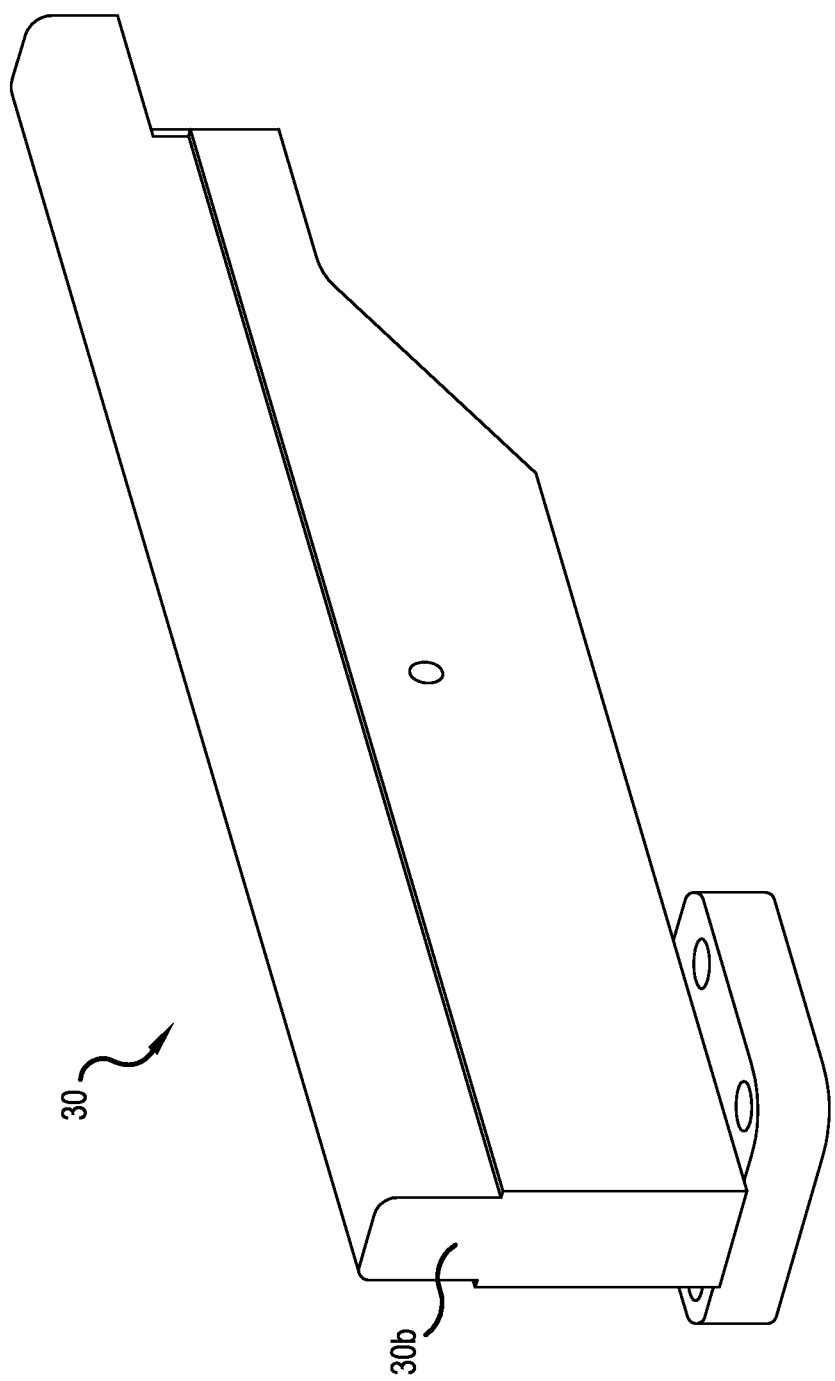
FIG. 10 is a second embodiment of an end piece for a measuring track from FIG. 8.

An appropriately adapted end piece or terminating piece 30, such as can be seen in FIG. 8, can be provided for the seat surface 28 of the measuring rail 21 located at the opposite end of the measuring track. The end piece or terminating piece 30 used in FIG. 8 is shown enlarged in FIG. 10. Such a piece is suitably further adapted to simultaneously allow a transition to a railway track, not shown in FIGS. 7 and 8, adjoining this end of the measuring track. In the simplest case, this can in turn be accomplished by means of a flat terminating surface 30b, as can be seen in FIG. 10.

Thus, once again the wheel contact force can generally be introduced by one load introduction part into two deformation bodies through two links in each case, regardless of the position that a wheel being tested assumes on the measuring rail, and in addition the tensile forces that arise during driving are transmitted to the deformation bodies and consequently are sensed by the strain gauges.

The embodiments of weighing modules according to the invention shown in FIGS. 7 and 8 thus each have at least three measuring points. Any desired number of such weighing modules can be arranged in a row. Only the beginning and end pieces, which is to say the transitions to the normal track, need to be implemented in an appropriately adapted manner, for example as shown in FIGS. 9 and 10. The spacing from support point to support point remains constant and can be adapted to the requirements (e.g., sleeper spacing).

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A measuring rail, comprising:
   a central rail portion, including a load introduction body, extending longitudinally between a first load exit plate and a second load exit plate in a ground plane, wherein the first and second load exit plates are in contact with the ground;
   a first outer rail portion extending longitudinally from the first load exit plate, and opposite a first direction, from the first load exit plate towards the second load exit plate;
   a second outer rail portion extending longitudinally from the second load exit plate, and opposite a second direction, from the second load exit plate towards the first load exit plate;
   a first longitudinal slot extending from a first bore hole in the first outer rail portion and a second longitudinal slot extending from a second bore hole in the second outer rail portion of the measuring rail;
   at least two strain gauges disposed in two recesses, one of the recesses disposed entirely within the first outer rail portion and one of the recesses disposed entirely within the second outer rail portion; and
   a first deformation body rigidly connected to the first load exit plate and a second deformation body rigidly connected to the second load exit plates, wherein the first deformation body is connected to the load introduction body by a first link disposed only in the first outer portion of the measuring rail and the second deformation body is connected to the load introduction body by a second link disposed only in the second outer portion of the measuring rail, and wherein at least two strain gauges are arranged within each deformation body such that the at least two strain gauges sense shear strains acting between the link and the load exit plate.

2. The measuring rail of claim 1, wherein each longitudinal slot extends longitudinally along a surface of each deformation body, the surface extending an entire length of a contact surface and opposite the contact surface, the contact surface being between each deformation body and each load exit plate.

3. The measuring rail of claim 1, wherein the load introduction body is completely separated laterally from the first load exit plate and the second load exit plate by the first and second longitudinal slots.

4. The measuring rail of claim 1, wherein the first and second longitudinal slots each extend at least a third of a longitudinal length of the measuring rail.

5. A measuring rail, comprising:
at least one load introduction body having a trapezoidal extension;
at least one deformation body mounted to a load exit plate in contact with a ground surface;
a longitudinal slot separating each load introduction body from each deformation body and extending through the width of the measuring rail; and
at least one recess disposed entirely within each deformation body, each recess containing a strain gauge, wherein each load introduction body is opposite each load exit plate and connected to each deformation body only via a single link, wherein at least half of each load introduction body, corresponding to each deformation body, extends from a first side of the load exit plate, wherein the deformation body extends from a second side of the load exit plate opposite the first side, wherein the at least one recess is disposed between the longitudinal slot and the ground surface, and wherein the single link is disposed at a first end of the longitudinal slot, the first end being opposite a second end of the longitudinal slot disposed at the load exit plate, such that the strain gauge senses shear strains acting between the single link and the load exit plate.

6. The measuring rail of claim 5, wherein the measuring rail comprises at least three load introduction parts and an equal number of links and an equal number of deformation bodies, along with a seat and a connector, and wherein the connector is configured to be brought into engagement with a seat of an identical measuring rail connected as a neighboring rail.

7. The measuring rail of claim 6, wherein an outer load introduction part is supported only on a deformation body of the same measuring rail, and wherein the connector of the same measuring rail serves to additionally support this outer load introduction part.

8. The measuring rail of claim 5, wherein each recess is offset longitudinally from the second side of the load exit plate and further from the first side of the load exit plate than the second side of the load exit plate.

* * * * *